United States Patent [19]

Myers et al.

[11] 4,248,732

[45] Feb. 3, 1981

[54] LASER PHOSPHATE GLASS COMPOSITIONS

[75] Inventors: John D. Myers, Perrysburg, Ohio; Charles S. Vollers, Blissfield, Mich.

[73] Assignee: Kigre, Inc., Toledo, Ohio

[21] Appl. No.: 877,606

[22] Filed: Feb. 14, 1978

Related U.S. Application Data

[63] Continuation-in-part of Ser. No. 577,331, May 14, 1975, Pat. No. 4,075,120.

[51] Int. Cl.$^2$ ................. C03C 3/16; C09K 11/42; C09K 11/46; C09K 11/10

[52] U.S. Cl. .................. 252/301.6 P; 106/47 Q; 106/52; 106/54

[58] Field of Search ............ 106/47 R, 47 Q, 52; 252/301.6 P, 301.4 P; 331/94 E

[56] References Cited

U.S. PATENT DOCUMENTS

| | | | |
|---|---|---|---|
| 3,846,142 | 11/1974 | Buzhinsky et al. | 252/301.4 P |
| 3,979,322 | 9/1976 | Alexeev et al. | 252/301.4 P |
| 4,022,707 | 5/1977 | Deutschbein et al. | 252/301.4 P |
| 4,076,647 | 2/1978 | Faulstich et al. | 252/301.4 P |

*Primary Examiner*—O. R. Vertiz
*Assistant Examiner*—Mark Bell
*Attorney, Agent, or Firm*—Richard D. Grauer; Raymond E. Scott

[57] ABSTRACT

Laser phosphate glass compositions are provided by combining constituent elements at defined amounts to form compositions which provide a balance of properties to the glass, especially high gain and low $n_2$.

15 Claims, No Drawings

LASER PHOSPHATE GLASS COMPOSITIONS

PRIOR PATENT APPLICATION

This application is a continuation-in-part application of our patent application, Ser. No. 577,331, filed on May 14, 1975, and now issued as U.S. Pat. No. 4,075,120.

BACKGROUND OF THE INVENTION

This invention relates to laser glass compositions for use in high energy applications, especially high peak power applications. More particularly, this invention relates to laser glass compositions of phosphorous pentoxide which include substantial amounts of selected alkaline earth oxides, substantial amounts of selected alkali metal oxides and further include the oxides of selected earth and/or rare earth metals, and mixtures thereof. High efficiency or gain, low $n_2$, good chemical durability and good optical quality for high energy applications are obtainable with the glasses of this invention.

It is highly desirable in the field of high peak power lasers that the laser material be efficient from the standpoint of power output compared to power input. Furthermore, the laser glass should be capable of resisting discoloration or solarization.

Glass laser compositions based on silica systems are currently used in the industry because of inherent advantages therein. More recently, some advances have been made with glass laser compositions based on phosphate systems, such as shown in U.S. Pat. no. 3,580,859, to overcome inherent disadvantages of silica systems, resulting from the structure of the silicates, their technical peculiarities and the purity of raw materials. The advances in the art with respect to phosphate systems have been limited, however, and are not used in the industry today, because these systems have, until the present invention, suffered from a number of disadvantages, including the difficulty of melting these glasses, poor optical quality and poor chemical durability. Laser phosphate glass compositions, however, generally demonstrate high gain and low $n_2$, thereby making them attractive to further pursue improved systems for use in the industry. High gain is generally accepted as the amplification capability of a matrix, for example glass. $n_2$ is the nonlinear refractive index coefficient, which describes the change in n. The importance of the nonlinear index, $n_2$, in lasers stems from the fact that undesirable higher values of $n_2$ are associated with self-focusing and frequency broadening in laser rods. Self-focusing occurs when the beam of light squeezes down upon itself to cause beam divergence and bubble formation, which leads to tracking damage.

The laser glass compositions of this invention, however, exhibit a superior balance between high gain and low $n_2$, and possess good melting capabilities, good chemical durability and good optical quality.

Consequently, it is an object of this invention to provide a laser phosphate glass for use in high energy applications, especially high peak power applications.

It is another object of this invention to provide a laser phosphate glass which provides and balances the properties of high gain, low $n_2$, ease of melting, good chemical durability, and good optical quality.

These and other objects will be readily apparent from the following detailed description which is intended only to illustrate and disclose the invention.

SUMMARY OF THE INVENTION

The laser phosphate glass compositions according to the invention consist essentially of certain balanced amounts of: $R_2O_3$, selected from the group including $Al_2O_3$, $La_2O_3$, $Y_2O_3$, $Tm_2O_3$, $B_2O_3$, $Er_2O_3$ and mixtures thereof; RO, selected from the alkaline earth oxide group including BaO, BeO, MgO, SrO, CaO, ZnO and mixtures thereof; $R_2O$, selected from alkali metal oxide group including $Li_2O$, $K_2O$, $Na_2O$, $Rb_2O$ and mixtures thereof; an oxide of a trivalent rare earth ion, selected from the group including $Nd_2O_3$, $Sm_2O_3$, $Yb_2O_3$, $Dy_2O_3$, $Pm_2O_3$, $Tm_2O_3$, $Er_2O_3$, $Ho_2O_3$, and $Tb_2O_3$; and a solarization inhibitor, selected from the group including $SiO_2$, $TiO_2$, $Sb_2O_3$, $CeO_2$, $Nb_2O_5$ and mixtures thereof. More specifically, the laser glasses of this invention comprises in mole percent: a phosphorous pentoxide content of about 35.0 to 65.0; a $R_2O_3$ content of about 0.01 to 15.0; a RO content of about 5.0 to 30.0; a $R_2O$ content of about 5.0 to 40.0; an oxide of trivalent rare earth ion content of about 0.01 to 7.0; and a solarization inhibitor content, on a weight percentage basis, up to the limits of solubility of each oxide.

Neodymium ions, known to be capable of stimulated emmission at room temperature, are used in the laser glasses of this invention primarily because they are the most efficient ions known today for solid state lasers. However, the other above-mentioned rare earth ions can be used.

Generally, impurities are detrimental to the use of the glasses of this invention and thereby great care is taken to obtain glasses that are 99.9 percent pure and better. Impurities such as copper, samarium, and molybdenum are detrimental, for example, since they absorb radiation.

Generally, phosphate glasses are difficult to melt and form into various shapes with optical qualities sufficient for lasing applications. But, with the additions as hereinafter described in detail, our invention has made it possible to substantially overcome these problems to the degree that phosphate glasses of this invention can be melted and formed into various shapes, possessing optical qualities sufficient for lasing applications.

In the glass industry, it is generally accepted that in order to stabilize glass, many varied constituents should be added to the batch composition, provided solubility parameters can be matched.

In practicing the invention, our laser phosphate glasses comprise a balanced ratio of $RO/R_2O/R_2O_3$, in order to improve the melting stability of the constituents to form glasses, to improve the chemical durability, water solubility and the gain of the glasses, and to prevent devitrification of the glasses. Furthermore, it has been found that with the proper $RO/R_2O/R_2O_3$ ratio, one or more RO can be substituted for another RO, and/or one or more $R_2O$ can be substituted for another $R_2O$, and/or one or more $R_2O_3$ can be substituted for another $R_2O_3$, without inducing devitrification or without affecting the stability of the melt.

The use of $P_2O_5$ instead of $SiO_2$ is desirable because a lower nonlinear index of refraction, $n_2$, and a high lasing gain is achievable. When the amount of $P_2O_5$ is too low, devitrification occurs thereby preventing formation of glasses. When the amount of $P_2O_5$ is too high, excessive volatilization during melting occurs and there is a tendency toward devitrification and poor chemical durability.

$R_2O_3$ is included in our laser glasses to help the chemical durability of the glasses and to decrease water solubility of the glasses. One or more $R_2O_3$ may be substituted for another $R_2O_3$ without affecting desired properties. When the amount of $R_2O_3$ is too low, the glass is water soluble. When the amount of $R_2O_3$ is too high, there is a decrease in gain.

The inclusion of RO in the glass composition is important to prevent devitrification and to improve the chemical durability and to render the glass insoluble in water. When the amount of RO is too low the glass is hygroscopic and possesses poor chemical durability and poor optical quality. When the amount of RO is too high, the glass will devitrify. The use of ZnO as an additional member of the RO group has been found to improve the pumping efficiency of the lasing material, to improve the overall gain, and to tend to reduce the expansion of the glass. When the amount of ZnO is too high, the chemical durability of the glass is adversely affected, and when too low devitrification occurs.

The inclusion of $R_2O$ in the glass composition is important to obtain stability during melting and also to decrease the hygroscopic characteristics of the glass. When the amount of $R_2O$ is too high, the glass will be hygroscopic. When the amount of $R_2O$ is too low, the glass will devitrify and demonstrate poor stability during melting.

$Nd_2O_3$ is present in an amount sufficient to obtain stimulated emmission at room temperature. When the amount is too low, insufficient pumping light is absorbed to store energy. When the amount is too high, concentration quenching occurs, which lowers the lifetime of the neodymium ion.

$SiO_2$ may be added to prevent solarization, which darkens the glass and results in substantial losses of efficiency. $SiO_2$ is not known to be a solarization inhibitor, but it has been found to so function and is tolerable up to its limit of solubility. Other conventional solarization inhibitors including $TiO_2$, $Sb_2O_3$, $CeO_2$, and mixtures thereof may be used, in combination with $SiO_2$, or alone. Additionally, $Nb_2O_5$ has been found to exhibit solarization inhibiting properties in th glasses of this invention, when used alone or in combination with the above mentioned solarization inhibitors. $Nb_2O_5$ also functions similar to $R_2O_3$, and thereby provides flexibility to the balancing of oxides in the glasses of this invention. When the $SiO_2$ amount is too low, there is no affect on the glass. When the $SiO_2$ amount is too high, the $SiO_2$ will not go into solution, thereby causing seed crystals.

The laser glasses of this invention may be prepared in accordance with recognized present-day melt procedures. Preferably, the melting is accomplished in refractory crucibles, such as fused quartz, zirconia and alumina, or in precious metal crucibles, such as platinum and platinum alloys. Melting of the glasses of this invention is accomplished at temperatures of from about 1500° F. to about 2300° F. Standard stirring and casting techniques are employed to obtain the desired forms, including rods, disks, plates, fibers, and other configurations associated with laser solid state technology.

DESCRIPTION OF THE PREFERRED EMBODIMENTS

The laser phosphate glasses of this invention have compositions falling within the range as shown below:

EXAMPLE I

| Ingredient | Mole Percent | Weight % |
| --- | --- | --- |
| $P_2O_5$ | 35 to 65 | |
| $R_2O_3$ | 0.01 to 15 | |
| RO | 5 to 30 | |
| $R_2O$ | 5 to 40 | |
| $Nd_2O_3$ | 0.01 to 7 | |
| Solarization inhibitor | | to limit of solubility | wherein $R_2O_3$ is selected from the group consisting of $Al_2O_3$, $La_2O_3$, $Y_2O_3$, $Tm_2O_3$, $B_2O_3$, $Er_2O_3$ and mixtures thereof, wherein RO is selected from the alkaline earth oxide group consisting of BaO, BeO, MgO, SrO, CaO, ZnO and mixtures thereof, wherein $R_2O$ is selected from the alkali metal oxide group consisting of $Li_2O$, $K_2O$, $Na_2O$, $Rb_2O$ and mixtures thereof; and wherein the solarization inhibitors are selected from the group consisting of $SiO_2$, $TiO_2$, $Sb_2O_3$, $CeO_2$, $Nb_2O_5$, and mixtures thereof, preferably on a weight basis up to their limit of solubility.

Preferred ranges of the compositions of this invention are shown below:

EXAMPLE II

| Ingredient | Mole Percent | Weight % |
| --- | --- | --- |
| $P_2O_5$ | 40–55 | |
| $R_2O_3$ | 0.1–10 | |
| RO | 7–25 | |
| $R_2O$ | 20–35 | |
| $Nd_2O_3$ | 0.1–3 | |
| Solarization inhibitor | | 0.1–10.0 | wherein $R_2O_3$, RO, $R_2O$, and the solarization inhibitor are the same as described in Example I.

Specific examples, as demonstrated by Examples VII–XIX, of the laser glasses of this invention were prepared by melting reagent grade raw materials by present-day melt procedures in refractory and/or precious metal crucibles at temperatures of from about 1500° F. to about 2300° F., and by employing standard stirring and casting techniques to obtain the desired forms. Subsequent to the formation of the melt, the glasses were annealed at temperatures of from about 750° F. to about 100° F. for about 20 hours. Rods (in most examples) ranging from ¼ inch to ½ inch diameter and about 4 inches in length were formed from the glass, and the ends of the rods were polished to a close tolerance having a flatness to 1/10 wavelength of sodium light, and having parallel ends to within 10 seconds of arc. The form of the amorphous phosphate glasses in some of the examples were disks, plates, and fibers. The rods were placed in a conventional water cooled laser cavity with polished silver-plated reflectors. The flash lamp was a commercially available Xenon lamp commonly used for these purposes. Both Q-switched and non-Q-switched lasing measurements were made using a rotating Q-switch and a 99.9% reflecting mirror respectively. In both cases, an 85% reflecting output mirror was used. Typical input energies to the flash lamp of from 3 to 30 joules in 150 microsecond pulses were employed.

Additional examples of phosphate glasses, falling short of the criteria of this invention, including the glasses of U.S. Pat. No. 3,580,859, have been prepared for comparison, as demonstrated by Examples III, IV, V, and VI.

EXAMPLE III

| Ingredient | Mole Percent |
| --- | --- |
| $P_2O_5$ | 50.0 |
| $K_2O$ | 33.0 |
| BaO | 16.5 |
| $Nd_2O_3$ | 0.5 |

The above composition lacks an oxide from the $R_2O_3$ group, such as $Al_2O_3$; the glass was extremely hygroscopic and it is easily devitrified.

EXAMPLE IV

| Ingredient | Mole Percent |
| --- | --- |
| $P_2O_5$ | 50.0 |
| $K_2O$ | 33.5 |
| MgO | 16.0 |
| $Nd_3O_3$ | 0.5 |

The above composition lacks an oxide from the $R_2O_3$ group, such as $Al_2O_3$; the glass was extremely hygroscopic and it is easily devitrified.

EXAMPLE V

| Ingredient | Mole Percent |
| --- | --- |
| $P_2O_5$ | 66.5 |
| CaO | 15.0 |
| BaO | 18.0 |
| $Nd_2O_3$ | 0.5 |

The above composition lacks oxides from the $R_2O_3$ and $R_2O$ groups, such as $Al_2O_3$ and $K_2O$ respectively; the glass was extremely hygroscopic and dissolved in water, and it exhibited poor optical qualities.

EXAMPLE VI

| Ingredient | Mole Percent |
| --- | --- |
| $P_2O_5$ | 45.0 |
| $Li_2O$ | 25.0 |
| $Na_2O$ | 25.0 |
| $Al_2O_3$ | 4.3 |
| $Nd_2O_3$ | 0.7 |

The above composition is representative of compositions disclosed in U.S. Pat. No. 3,580,859. This composition lacks an oxide from the RO group, such as BaO. This glass was very volatile upon melting, with respect to $P_2O_5$ and the resulting melt was too fluid because of its low melting point. The resulting glass was of poor quality, having excessive striae throughout, and was cloudy in appearance. The glass was not chemically durable and it devitrified, even though an oxide from the $R_2O_3$ group was present, because it lacks an oxide from the RO group.

EXAMPLE VII

| Ingredient | Mole Percent |
| --- | --- |
| $P_2O_5$ | 40.0 |
| $Li_2O$ | 35.0 |
| CaO | 20.0 |
| $Al_2O_3$ | 4.3 |
| $Nd_2O_3$ | 0.7 |

This glass exhibited good lasing characteristics and good chemical durability.

EXAMPLE VIII

| Ingredient | Mole Percent |
| --- | --- |
| $P_2O_5$ | 50.0 |
| $Li_2O$ | 30.0 |
| CaO | 10.0 |
| $Al_2O_3$ | 4.3 |
| $Nd_2O_3$ | 0.7 |
| $SiO_2$ | 5.0 |

This glass exhibited good gain and had no tendency to solarize.

EXAMPLE IX

| Ingredient | Mole Percent |
| --- | --- |
| $P_2O_5$ | 55.0 |
| $Li_2O$ | 30.0 |
| $Al_2O_3$ | 4.3 |
| CaO | 10.0 |
| $Nd_2O_3$ | 0.7 |

This glass exhibited high gain, low $n_2$, good optical qualities, good chemical durability and ease of melting.

EXAMPLE X

| Ingredient | Mole Percent |
| --- | --- |
| $P_2O_5$ | 45.0 |
| $Li_2O$ | 30.0 |
| CaO | 20.0 |
| $Al_2O_3$ | 4.3 |
| $Nd_2O_3$ | 0.7 |

This glass exhibited high gain, low $n_2$, good optical qualities, good chemical durability and ease of melting.

EXAMPLE XI

| Ingredient | Mole Percent |
| --- | --- |
| $P_2O_5$ | 55.0 |
| $Na_2O$ | 30.0 |
| CaO | 10.0 |
| $Al_2O_3$ | 4.3 |
| $Nd_2O_3$ | 0.7 |

This glass exhibited high gain, low $n_2$, good optical qualities, good chemical durability and ease of melting.

EXAMPLE XII

| Ingredient | Mole Percent |
| --- | --- |
| $P_2O_5$ | 55.0 |
| $Rb_2O$ | 30.0 |
| CaO | 10.0 |
| $Al_2O_3$ | 4.3 |
| $Nd_2O_3$ | 0.7 |

This glass exhibited good lasing characteristics and good chemical durability.

EXAMPLE XIII

| Ingredient | Mole Percent |
| --- | --- |
| $P_2O_5$ | 45.0 |
| $Li_2O$ | 25.0 |
| $Na_2O$ | 15.0 |
| CaO | 10.0 |
| $Al_2O_3$ | 4.3 |
| $Nd_2O_3$ | 0.7 |

This glass exhibited good lasing characteristics and good chemical durability.

EXAMPLE XIV

| Ingredient | Mole Percent |
| --- | --- |
| $P_2O_5$ | 45.0 |
| $Li_2O$ | 40.0 |
| CaO | 10.0 |
| $Al_2O_3$ | 4.3 |
| $Nd_2O_3$ | 0.7 |

This glass exhibited good lasing characteristics and good chemical durability.

EXAMPLE XV

| Ingredient | Mole Percent |
| --- | --- |
| $P_2O_5$ | 50.0 |
| $K_2O$ | 30.0 |
| BaO | 15.0 |
| $Al_2O_3$ | 4.3 |
| $Nd_2O_3$ | 0.7 |

This glass exhibited good lasing characteristics and good chemical durability.

EXAMPLE XVI

| Ingredient | Mole Percent |
| --- | --- |
| $P_2O_5$ | 50.0 |
| $K_2O$ | 31.5 |
| MgO | 15.0 |
| $Al_2O_3$ | 3.0 |
| $Nd_2O_3$ | 0.5 |

This glass exhibited good lasing characteristics and good chemical durability.

EXAMPLE XVII

| Ingredient | Mole Percent |
| --- | --- |
| $P_2O_5$ | 49.3 |
| $Li_2O$ | 33.5 |
| CaO | 10.9 |
| $Al_2O_3$ | 5.0 |
| $Nd_2O_3$ | 1.3 |

This glass exhibited good lasing characteristics and good chemical durability.

The following examples demonstrate the inclusion of lasing ions other than neodymium; they were satisfactorily melted and cast in forms suitable for lasing cross-section measurements.

EXAMPLE XVIII

| Ingredient | Mole Percent |
| --- | --- |
| $P_2O_5$ | 62.0 |
| $Na_2O$ | 15.0 |
| BaO | 18.0 |
| $Al_2O_3$ | 4.6 |
| $Tm_2O_3$ | 0.4 |

EXAMPLE XIX

| Ingredient | Mole Percent |
| --- | --- |
| $P_2O_5$ | 62.0 |
| $Na_2O$ | 15.0 |
| BaO | 18.0 |
| $Al_2O_3$ | 4.6 |
| $Er_2O_3$ | 0.4 |

EXAMPLE XX

| Ingredient | Mole Percent | Weight % |
| --- | --- | --- |
| $P_2O_5$ | 45.0 | |
| $Li_2O$ | 35.0 | |
| ZnO | 15.0 | |
| $Al_2O_3$ | 3.6 | |
| $Nd_2O_3$ | 1.4 | |
| $Nb_2O_5$ | | 1.0 |

This glass exhibited good lasing characteristics and good chemical durability.

EXAMPLE XXI

| Ingredient | Mole Percent | Weight % |
| --- | --- | --- |
| $P_2O_5$ | 50.0 | |
| $Li_2O$ | 37.5 | |
| ZnO | 7.5 | |
| $Al_2O_3$ | 3.6 | |
| $Nd_2O_3$ | 1.4 | |
| $Nb_2O_5$ | | 1.0 |

This glass exhibited good lasing characteristics and good chemical durability.

EXAMPLE XXII

| Ingredient | Mole Percent | Weight % |
| --- | --- | --- |
| $P_2O_5$ | 53.7 | |
| $Li_2O$ | 29.3 | |
| ZnO | 9.2 | |
| $Al_2O_3$ | 6.4 | |
| $Nd_2O_3$ | 1.4 | |
| $Nb_2O_5$ | | 3.0 |

This glass exhibited good lasing characteristics and good chemical durability.

EXAMPLE XXIII

| Ingredient | Mole Percent | Weight % |
| --- | --- | --- |
| $P_2O_5$ | 55.5 | |
| $Li_2O$ | 23.3 | |
| ZnO | 15.4 | |
| $Al_2O_3$ | 4.4 | |
| $Nd_2O_3$ | 1.4 | |

| Ingredient | Mole Percent | Weight % |
|---|---|---|
| Nb$_2$O$_5$ | | 2.0 |

This glass exhibited good lasing characteristics and good chemical durability.

EXAMPLE XXIV

| Ingredient | Mole Percent | Weight % |
|---|---|---|
| P$_2$O$_5$ | 50.0 | |
| Li$_2$O | 35.0 | |
| ZnO | 5.0 | |
| CaO | 5.0 | |
| Al$_2$O$_3$ | 3.6 | |
| Nd$_2$O$_3$ | 1.4 | |
| Nb$_2$O$_5$ | | 1.0 |
| Sb$_2$O$_3$ | | 0.5 |

This glass exhibited good lasing characteristics and good chemical durability.

EXAMPLE XXV

| Ingredient | Mole Percent | Weight % |
|---|---|---|
| P$_2$O$_5$ | 40.0 | |
| Li$_2$O | 27.5 | |
| ZnO | 18.3 | |
| CaO | 9.2 | |
| Al$_2$O$_3$ | 3.6 | |
| Nd$_2$O$_3$ | 1.4 | |
| Nb$_2$O$_5$ | | 1.0 |

This glass exhibited good lasing characteristics and good chemical durability.

EXAMPLE XXVI

| Ingredient | Mole Percent | Weight % |
|---|---|---|
| P$_2$O$_5$ | 58.0 | |
| Li$_2$O | 32.0 | |
| ZnO | 5.0 | |
| Al$_2$O$_3$ | 3.5 | |
| Nd$_2$O$_3$ | 1.5 | |
| Nb$_2$O$_5$ | | 2.0 |
| Sb$_2$O$_3$ | | 1.0 |

This glass exhibited good lasing characteristics and good chemical durability.

EXAMPLE XXVII

| Ingredient | Mole Percent | Weight % |
|---|---|---|
| P$_2$O$_5$ | 49.0 | |
| Li$_2$O | 27.0 | |
| ZnO | 19.0 | |
| Al$_2$O$_3$ | 3.6 | |
| Nd$_2$O$_3$ | 1.4 | |
| Nb$_2$O$_5$ | | 1.0 |
| Sb$_2$O$_3$ | | 1.0 |

This glass exhibited good lasing characteristics and good chemical durability.

EXAMPLE XXVIII

| Ingredient | Mole Percent | Weight % |
|---|---|---|
| P$_2$O$_5$ | 50.0 | |
| Li$_2$O | 15.0 | |
| ZnO | 30.0 | |
| Al$_2$O$_3$ | 3.6 | |
| Nd$_2$O$_3$ | 1.4 | |
| Nb$_2$O$_5$ | | 1.0 |

This glass exhibited good lasing characteristics and good chemical durability.

EXAMPLE XXIX

| Ingredient | Mole Percent | Weight % |
|---|---|---|
| P$_2$O$_5$ | 50.0 | |
| Na$_2$O | 25.0 | |
| ZnO | 10.0 | |
| CaO | 10.0 | |
| Al$_2$O$_3$ | 4.1 | |
| Nd$_2$O$_3$ | 0.9 | |
| Sb$_2$O$_3$ | | 0.5 |
| Nb$_2$O$_5$ | | 0.5 |

This glass exhibited good lasing characteristics and good chemical durability.

EXAMPLE XXX

| Ingredient | Mole Percent | Weight % |
|---|---|---|
| P$_2$O$_5$ | 45.0 | |
| K$_2$O | 22.5 | |
| ZnO | 22.5 | |
| Al$_2$O$_3$ | 3.6 | |
| B$_2$O$_3$ | 5.0 | |
| Nd$_2$O$_3$ | 1.4 | |
| CeO$_2$ | | 1.0 |
| Nb$_2$O$_5$ | | 1.0 |

This glass exhibited good lasing characteristics and good chemical durability.

EXAMPLE XXXI

| Ingredient | Mole Percent | Weight % |
|---|---|---|
| P$_2$O$_5$ | 50.0 | |
| Na$_2$O | 5.0 | |
| Li$_2$O | 25.0 | |
| ZnO | 10.0 | |
| MgO | 5.0 | |
| Al$_2$O$_3$ | 4.1 | |
| Nd$_2$O$_3$ | 0.9 | |
| Sb$_2$O$_3$ | | 1.0 |
| Nb$_2$O$_5$ | | 2.0 |

This glass exhibited good lasing characteristics and good chemical durability with increased gain.

What is claimed is:

1. A laser glass consisting essentially of the following ingredients in mole percentages:

| Ingredient | Mole Percent | Weight % |
|---|---|---|
| P$_2$O$_5$ | 35 to 65 | |
| R$_2$O$_3$ | 0.01 to 15 | |
| RO | 5 to 30 | |
| R$_2$O | 5 to 40 | |
| Nd$_2$O$_3$ | 0.01 to 7 | |
| Solarization inhibitor | | to limit of solubility | wherein $R_2O_3$ is selected from the group consisting of $Al_2O_3$, $La_2O_3$, $Y_2O_3$, $Tm_2O_3$, $B_2O_3$, $Er_2O_3$ and mixtures thereof, wherein RO is ZnO and mixtures of ZnO with alkaline earth oxides selected from the group consisting of BaO, BeO, MgO, SrO, and CaO, wherein $R_2O$ is selected from the alkali metal oxide group consisting of $Li_2O$, $K_2O$, $Na_2O$, $Rb_2O$, and mixtures thereof, and wherein the solarization inhibiting oxide is present in an amount sufficient to prevent discoloration, and wherein said solarization inhibiting oxide is selected from the group consisting of $Nb_2O_5SiO_2$, $TiO_2$, CeO, and $Sb_2O_3$ and mixtures thereof.

2. The laser glass as defined in claim 1, wherein the following ingredients are in mole percentages:

| Ingredient | Mole Percent | Weight % |
|---|---|---|
| $P_2O_5$ | 40–55 | |
| $R_2O_3$ | 0.1–10 | |
| RO | 7–25 | |
| $R_2O$ | 20–35 | |
| $Nd_2O_3$ | 0.1–3 | |
| Solarization inhibitor | | 0.1–10.0 |

3. The laser glass as defined in claim 1, wherein the glass is in the form of rods and wherein said rods possess good optical properties.

4. The laser glass as defined in claim 1, wherein the glass is in the form of disks and wherein said disks possess good optical properties.

5. The laser glass as defined in claim 1, wherein the glass is in the form of plates and wherein said plates possess good optical properties.

6. The laser glass as defined in claim 1, wherein the glass is in the form of fibers and wherein said fibers possess good optical properties.

7. A laser glass comprising the following ingredients in mole percentages:

| Ingredient | Mole Percent | Weight % |
|---|---|---|
| $P_2O_5$ | 45.0 | |
| $Li_2O$ | 35.0 | |
| ZnO | 15.0 | |
| $Al_2O_3$ | 3.6 | |
| $Nd_2O_3$ | 1.4 | |
| $Nb_2O_5$ | | 1.0 |

8. A laser glass comprising the following ingredients in mole percentages:

| Ingredient | Mole Percent | Weight % |
|---|---|---|
| $P_2O_5$ | 50.0 | |
| $Li_2O$ | 35.0 | |
| ZnO | 5.0 | |
| CaO | 5.0 | |
| $Al_2O_3$ | 3.6 | |
| $Nd_2O_3$ | 1.4 | |
| $Nb_2O_5$ | | 1.0 |
| $Sb_2O_5$ | | 0.5 |

9. A laser glass consisting essentially of the following ingredients in mole percentages:

| Ingredients | Mole Percent | Weight % |
|---|---|---|
| $P_2O_5$ | 40.0 | |
| $Li_2O$ | 27.5 | |
| ZnO | 18.3 | |
| CaO | 9.2 | |
| $Al_2O_3$ | 3.6 | |
| $Nd_2O_3$ | 1.4 | |
| $Nb_2O_5$ | | 1.0 |

10. A laser glass comprising the following ingredients in mole percentages:

| Ingredients | Mole Percent | Weight % |
|---|---|---|
| $P_2O_5$ | 55.5 | |
| $Li_2O$ | 23.3 | |
| ZnO | 15.4 | |
| $Al_2O_3$ | 4.4 | |
| $Nd_2O_3$ | 1.4 | |
| $Nb_2O_5$ | | 2.0 |

11. A laser glass comprising the following ingredients in mole percentages:

| Ingredients | Mole Percent | Weight % |
|---|---|---|
| $P_2O_5$ | 50.0 | |
| $Na_2O$ | 5.0 | |
| $Li_2O$ | 25.0 | |
| ZnO | 10.0 | |
| MgO | 5.0 | |
| $Al_2O_3$ | 4.1 | |
| $Nd_2O_3$ | 0.9 | |
| $Sb_2O_3$ | | 1.0 |
| $Nb_2O_5$ | | 2.0 |

12. A laser glass comprising the following ingredients in mole percentages:

| Ingredients | Mole Percent | Weight % |
|---|---|---|
| $P_2O_5$ | 58.0 | |
| $Li_2O$ | 32.0 | |
| ZnO | 5.0 | |
| $Al_2O_3$ | 3.5 | |
| $Nd_2O_3$ | 3.5 | |
| $Nb_2O_5$ | | 2.0 |
| $Sb_2O_3$ | | 1.0 |

13. A laser glass comprising the following ingredients in mole percentages:

| Ingredients | Mole Percent | Weight % |
|---|---|---|
| $P_2O_5$ | 50.0 | |
| $Li_2O$ | 15.0 | |
| ZnO | 30.0 | |
| $Al_2O_3$ | 3.6 | |
| $Nd_2O_3$ | 1.4 | |
| $Nb_2O_5$ | | 1.0 |

14. A laser glass comprising the following ingredients in mole percentages:

| Ingredients | Mole Percent | Weight % |
|---|---|---|
| $P_2O_5$ | 50.0 | |
| $Na_2O$ | 25.0 | |
| ZnO | 10.0 | |
| CaO | 10.0 | |
| $Al_2O_3$ | 4.1 | |
| $Nd_2O_3$ | 0.9 | |
| $Sb_2O_3$ | | 0.5 |

| Ingredients | Mole Percent | Weight % |
|---|---|---|
| -continued | | |
| Nb$_2$O$_5$ | | 0.5 |

15. A laser glass comprising the following ingredients in mole percentages:

| Ingredients | Mole Percent | Weight % |
|---|---|---|
| P$_2$O$_5$ | 45.0 | |
| K$_2$O | 22.5 | |
| ZnO | 22.5 | |
| Al$_2$O$_3$ | 3.6 | |
| B$_2$O$_3$ | 5.0 | |
| Nd$_2$O$_3$ | 1.4 | |
| CeO$_2$ | | 1.0 |
| Nb$_2$O$_5$ | | 1.0 |

* * * * *

UNITED STATES PATENT AND TRADEMARK OFFICE
CERTIFICATE OF CORRECTION

PATENT NO. : 4,248,732
DATED : February 3, 1981
INVENTOR(S) : John D. Myers

It is certified that error appears in the above-identified patent and that said Letters Patent is hereby corrected as shown below:

Delete Claims 1 through 8 and Claims 10 through 12.

Claims 13, 14 and 15, first line of each, "comprising" should read -- consisting essentially of --.

Claims 9, 13, 14 and 15, should be renumbered to read --1, 2, 3 and 4--. On the title page, "15 Claims" should read -- 4 Claims --.

Signed and Sealed this

Twenty-ninth Day of May 1984

[SEAL]

Attest:

GERALD J. MOSSINGHOFF

Attesting Officer     Commissioner of Patents and Trademarks